Sept. 26, 1950  F. A. FORD, JR  2,523,504
ENGINE MOUNT

Filed July 22, 1946  2 Sheets-Sheet 1

INVENTOR.
Frederick A. Ford Jr.

BY William R. Lane

Attorney

Sept. 26, 1950     F. A. FORD, JR     2,523,504
ENGINE MOUNT

Filed July 22, 1946     2 Sheets-Sheet 2

INVENTOR.
Frederick A. Ford Jr.
BY William P. Lane
Attorney

Patented Sept. 26, 1950

2,523,504

UNITED STATES PATENT OFFICE 2,523,504

ENGINE MOUNT

Frederick A. Ford, Jr., Los Angeles, Calif., assignor to North American Aviation, Inc.

Application July 22, 1946, Serial No. 685,314

10 Claims. (Cl. 248—5)

This invention relates to resilient mountings and more particularly to mountings for aircraft engines.

It is an object of this invention to provide a mounting which is highly resilient within predetermined vibrational limits, but which effectively dampens vibrations beyond those limits.

It is a further object to provide a soft mount having relatively high deflection characteristics but with increased stiffness or dampening characteristics corresponding to increase in engine vibration.

It is still a further object to provide an engine mount which utilizes unbonded rubber in shear and compression corresponding to engine vibrational characteristics.

It is still a further object of this invention to provide a mount which effectively dampens vibrations and which at the same time resiliently carries large loads.

It is yet another object of this invention to provide a simple, light weight, inexpensive mount which is not only easy to construct and adjust, but may also be easily disassembled to replace parts which do not have proper characteristics or which have become worn or fatigued.

Other objects of invention will become apparent from the drawings and written description in which:

Fig. 1 is a side elevation view of a cantilever type engine mount utilizing my invention, Fig. 2 is a longitudinal sectional view of the mounting taken along the lines 2—2 of Fig. 5, Fig. 3 is a transverse sectional view taken along the lines 3—3 of Fig. 5, Fig. 4 is a perspective view of the mount assembly including the engine attaching plate, Fig. 5 is a sectional view taken along the lines 5—5 of Fig. 2, Fig. 6 is a top plan view of the mounting with parts in section.

Figure 1:
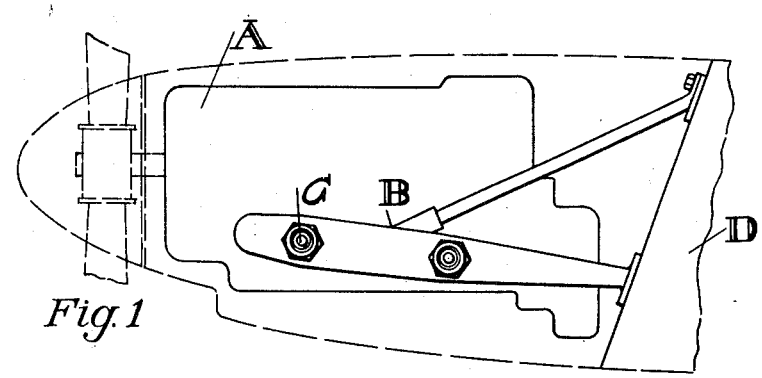
Figure 2:
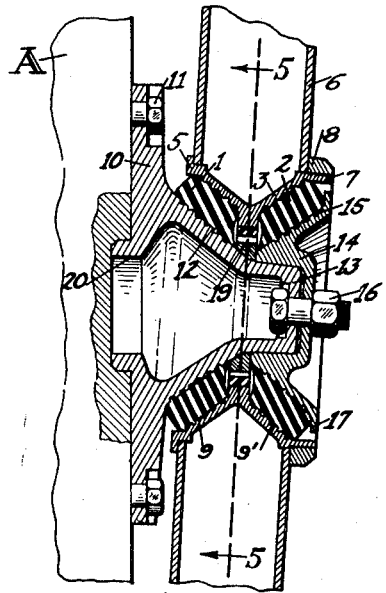
Figure 3:
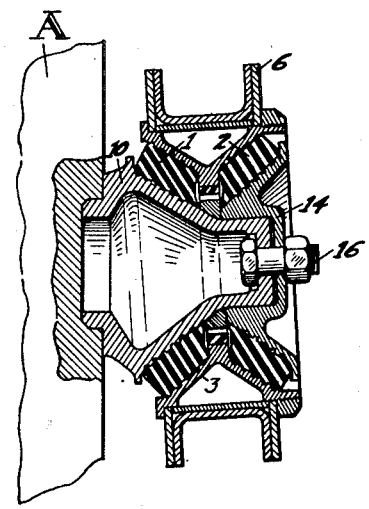
Figure 4:
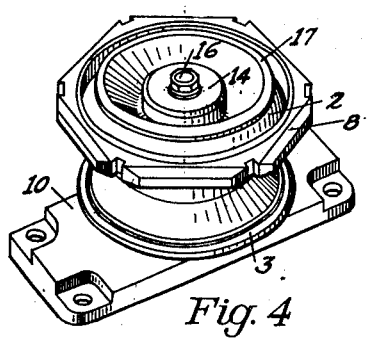
Figure 5:
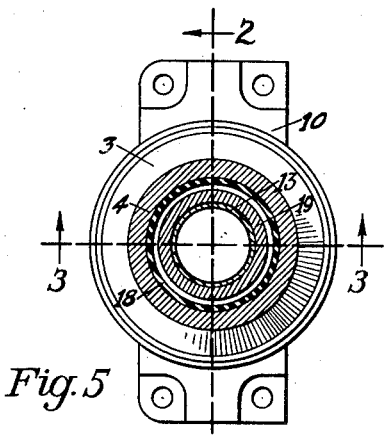
Figure 6:
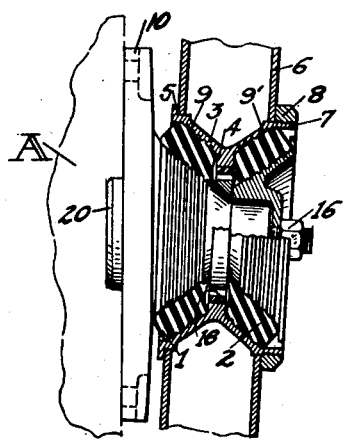
Figure 7:
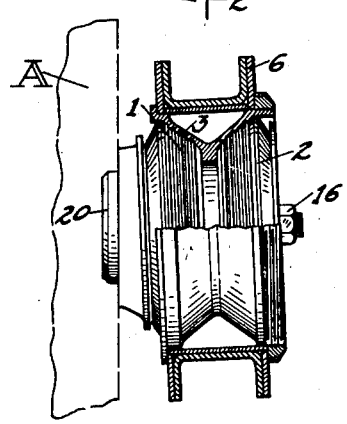
Fig. 7 is an end view with parts in section.

Referring to Fig. 1, engine A is suspended from aircraft or other structure D by a pair of mounts B, one of which is shown. The engine is attached to the mounts by a suitable number of assemblies referred to generally as C.

Figures 8, 9:
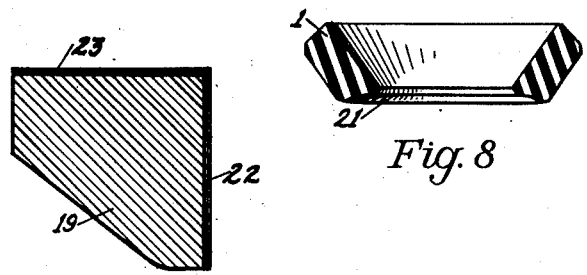
Fig. 8 is a sectional view of one of the resilient mounting members in an uncompressed state.
Fig. 9 is an enlarged cross sectional view of one of the separator rings showing adjusting shims associated therewith.

Each assembly C comprises a pair of annular resilient members 1 and 2 which in their uncompressed state (as shown in Fig. 8) appear as hollow, truncated cones having flat, parallel inner and outer surfaces. The lower ends of these resilient members as illustrated in Fig. 8 are suitably trimmed or curved at 21 to avoid interference with other parts of the mount when the resilient members are compressed. These resilient members are operatively positioned within a fitting 3 having opposed and outwardly flaring annular surfaces 9 and 9', corresponding generally to the outer flat surfaces of the annular resilient members. This fitting is provided with an annular separator ridge 4 for supporting the snubbing ring 18 and for separating and confining the inner edges of the annular resilient members 1 and 2 in assembled position. Fitting 3 is provided with a flange at 5 for engagement with one side of the supporting arm 6 which in turn forms a part of cantilever engine mount B. The opposite side of member 3 is provided with a threaded portion at 7 for engagement by a lock nut 8 for fastening fitting 3 to supporting arm 6. The outwardly flaring annular surfaces 9 and 9' of fitting 3 are preferably grooved or serrated to prevent slippage of the members 1 and 2 while being precompressed or subjected to load.

The engine A is attached to the mount by means of a bracket 10 suitably attached to the engine by means of bolts 11 and projection 20. The bracket is provided with a conical faced serrated surface 12 and a boss or hub 13 adapted to be received in member 14 having in turn a serrated face 15 corresponding to face 12 but oppositely inclined with respect thereto. Member 14 is adjustably positioned and held on boss 13 by means of a suitable bolt 16. The position of member 14 and correspondingly the amount of precompression in members 1 and 2 is determined by lateral washers or laminations 22 (Fig. 9) adjacent member 19 which in effect vary the width of that member. The amount of permissible deflection may be varied by circumferential laminations or washers 23.

Member 14 is provided with a flange 17 for confining rubber ring 2 in its compressed state. The outer portions of rings 1 and 2 are further confined by respective engagement with the under portions of flange 5 and threaded part 7 and with the bolt carrying flange of member 10. The assembly further comprises a resilient auxiliary support or annular snubbing ring 18 positioned against spacer 4 in the preferred embodiment of the invention and between annular rings 1 and 2. Snubber 18 may, of course, be positioned against member 19. Also positioned between members 1 and 2 to assist in adjustably confining those members in their compressed state is an additional spacer ring 19 of non-resilient material shaped to be positioned on the boss and inclined face of bracket 10.

Where concentric rings or serrations are provided on surfaces 9, 9', 12, and 15, the rubber is forced therein upon compression of the rubber. Members 13, 14, and 19 are so formed as to provide desired adjustment within the range of operation of the device. An engine load applied through the mount to the cantilever engine mount B initially places the rings 1 and 2 in combined shear and compression and the engine is so supported throughout normal vibrations within predetermined limits. Beyond those limits the rubber is compressed correspondingly to the vibrations or deflections resulting from increased load so that the greater the vibration or deflection the greater the resistance thereto.

In the assembly and operation of the device, engine A is held in proximity to the mount by any suitable means and thereupon attached to cantilever mount B by means of the assemblies C. Assemblies C may be previously attached to the engine and merely attached to the mount by positioning fittings 3 in their corresponding openings and fastening by means of lock nuts 8 on threaded flanges 7 or in any other suitable manner. If it is found that the vibrational or deflectional characteristics of any particular assembly are unsatisfactory it may be readily disassembled by unscrewing bolt 16 and removing member 14. Resilient rings 1 and 2 may be replaced as desired or the amount of precompression in those members may be adjusted by suitably removing shims or laminations 22 from the member 19. A particular assembly may be removed by carrying the weight of the engine by means of the remaining connected assemblies or otherwise providing a support for the engine. In some instances it may be desirable to remove a particular mount assembly for adjustment or replacement, although in the normal instance merely adjusting the precompression in resilient members 1 and 2 will suffice.

The angle of inclination of the faces of the fitting and the bracket may be varied according to the amount of stress to be placed in the resilient members in compression and in shear. If it is desired to carry the load largely in shear the angle of such faces will be inclined to a greater degree towards the vertical, whereas the more it is desired to carry such load in compression the more the angle will incline toward the horizontal. While the respective faces of the fitting, bracket, and resilient members are shown to be substantially parallel, they may, nevertheless, have their surfaces at varying angles, depending upon the amount of precompression desired and the direction of application of stress to the resilient members. The surfaces of the resilient members may be curved to any desired degree depending upon the prestressing conditions desired.

In the preferred embodiment of the invention it has been found that for a particular engine the vibrational and deflectional characteristics are such that these faces should be at an angle of approximately 37½° from the vertical and that with faces so placed the engine is allowed to deflect by a relatively large amount up to loads of approximately three G's. Beyond that, snubber 18 comes into operation slightly at first but with increased effect with increased deflection. The snubber action, together with the increased compression forces of the resilient members, provide stiffened resistance to prevent excessive movement of the engine. At about eight G's the snubber 18 may carry one-half or more of the stress, thus providing a mount of considerable stiffness while at the same time providing a resilient mount. The vibrational characteristics of the mount may be varied by— in addition to the angle of inclination of the resilient members—the amount of restriction of the resilient means, the hardness of the resilient means, which is a function of its cure or composition when rubber is used, and the amount of precompression. The latter generally is sufficient in the preferred embodiment of the invention to prevent separation of the resilient means, for instance, in the upper portion thereof when the load is carried on the lower part. The angle of inclination controls the rate of deflection, or spring rate, which in turn controls the vibration both vertically and horizontally, horizontal or lateral vibration being relatively small in the preferred embodiment of the invention.

It is to be understood, of course, that various modifications and changes may be made in this invention within the scope thereof. For instance, the mount may be used in conjunction with a metal tube of monocoque or other type.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A mount assembly for resiliently attaching a member subject to vibration to a supporting member, comprising bracket means adapted to be attached to one of said members, fitting means adapted to be attached to the other of said members and interposed resilient means, said bracket means comprising a conically shaped inclined face, a hub portion, a member having a surface engaging said hub portion and a conically shaped face inclined oppositely to the face on said bracket means, and adjustable spacer means positioned at the junction of said inclined faces, said fitting means comprising a pair of faces oppositely inclined and substantially parallel when in normal position to the inclined faces on said bracket means, spacer means at the junction of said inclined faces and snubber means on one of said spacer means.

2. A device as recited in claim 1 in which said faces are predeterminately inclined corresponding to the proportion of stress to be carried by said resilient means in shear and in compression.

3. A device as recited in claim 1 in which said faces are predeterminately inclined and said resilient means confined and precompressed corresponding to the proportion of stress to be carried by said resilient means in shear and in compression.

4. A mount assembly for resiliently attaching a member subject to vibration to a supporting member comprising bracket means having a pair of oppositely inclined conically shaped faces and fitting means having a pair of oppositely inclined faces spaced from and conically shaped to correspond to the faces of said bracket means;

resilient means interposed between said faces; means for partially confining the outer ends of said resilient means comprising flanges partially overlying said ends; and spacer means partially confining the inner ends of said resilient means for laterally positioning the same to provide an open space therebetween, whereby vibration loads are carried by the resilient means in compression, and in shear to the extent that said resilient material flows into said open space.

5. A mount as recited in claim 4 and further including spacer means at the junction of said inclined faces for separating and predeterminately partially confining said resilient means.

6. A mount as recited in claim 4 and further including spacer means at the junction of said inclined faces for separating and partially confining said resilient means, at least one of said spacer means to precompress said resilient means a predetermined amount.

7. A device as recited in claim 4 and further including auxiliary supporting and snubber means for absorbing vibration forces beyond the compression and shear capacity of said mount.

8. A mount as recited in claim 4 in which said faces are predeterminately inclined corresponding to the proportion of stress to be carried by said resilient means in shear and in compression.

9. A mount as recited in claim 4 in which said faces are predeterminately inclined and said resilient means confined and precompressed corresponding to the proportion of stress to be carried by said resilient means in shear and in compression.

10. A mount assembly for resiliently attaching a member subject to vibration to a supporting member, comprising bracket means adapted to be attached to one of said members and fitting means adapted to be attached to the other of said members, said bracket and said fitting means being provided with oppositely inclined faces; laterally spaced resilient means between correspondingly inclined faces of said bracket and fitting means; means for partially confining the outer ends of said resilient means; spacer means at the junction of each of said inclined faces for separating and partially confining the inner ends of said resilient means; and snubber means on one of said spacer means for augmenting resistance to vibration and for limiting total vibration of said first named member.

FREDERICK A. FORD, Jr.

REFERENCES CITED

The following references are of record in the file of this patent:

UNITED STATES PATENTS

| Number | Name | Date |
| --- | --- | --- |
| 1,815,442 | Masury | July 21, 1931 |
| 1,892,065 | Markey | Dec. 27, 1932 |
| 2,365,421 | Lord | Dec. 19, 1944 |
| 2,367,697 | Stitz et al. | Jan. 23, 1945 |